UNITED STATES PATENT OFFICE.

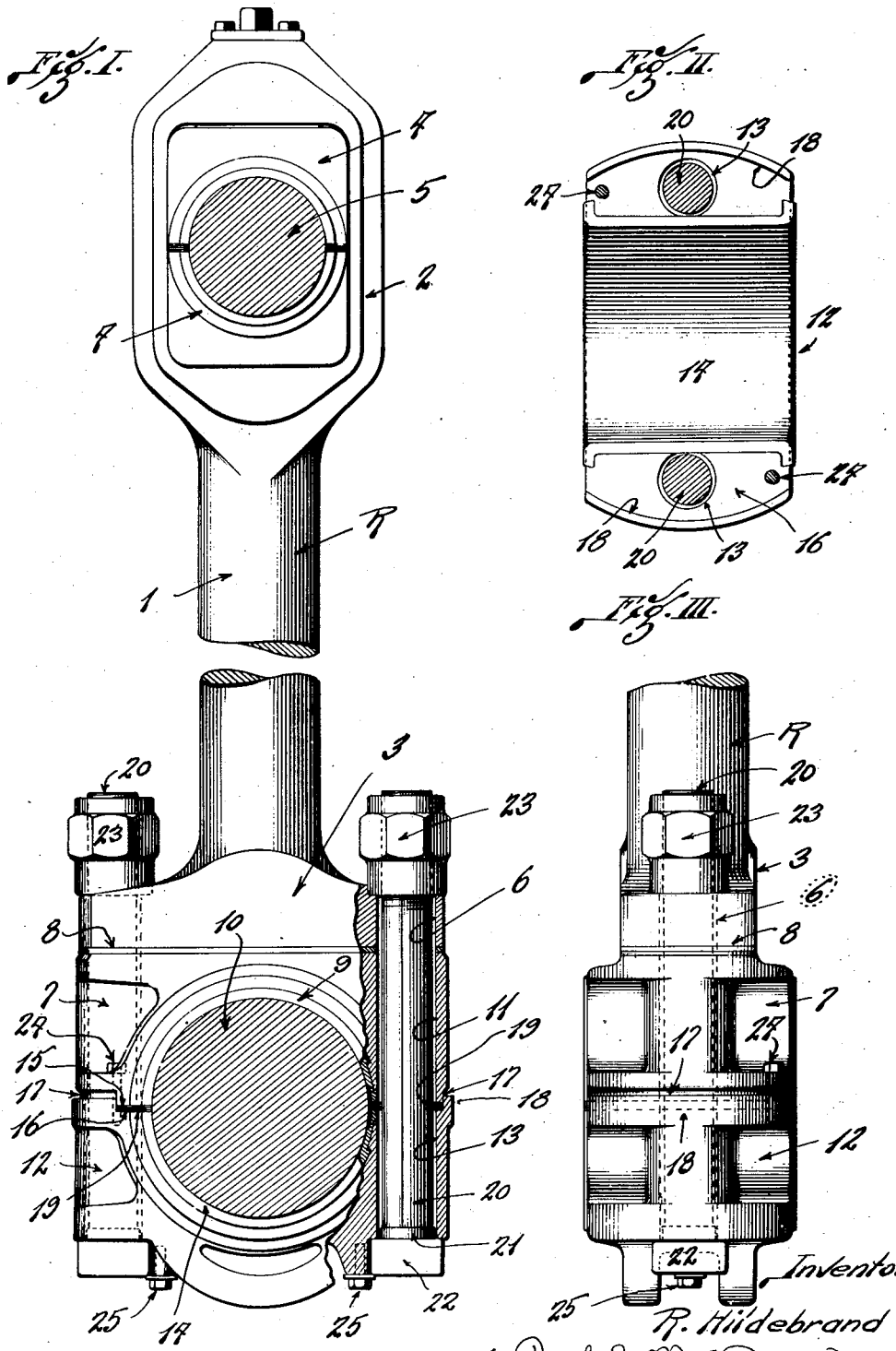

REINHARD HILDEBRAND, OF WEBSTER GROVES, MISSOURI.

BEARING.

1,385,683. Specification of Letters Patent. Patented July 26, 1921.

Application filed June 23, 1920. Serial No. 391,175.

*To all whom it may concern:*

Be it known that I, REINHARD HILDEBRAND, a citizen of Germany, and a resident of Webster Groves, in the county of St. Louis, State of Missouri, have invented certain new and useful Improvements in Bearings, of which the following is a full, clear, and exact description, reference being had to the accompanying drawings, forming a part of this specification.

My invention relates to improvements in bearings and the new bearing is adapted for use at one end of a connecting-rod, although it is to be understood that the invention is not limited to such use. The main object of the invention is to provide a very strong, simple and inexpensive means for interlocking the bearing members with each other.

Figure I is a side elevation of the assembled rod showing portions of the shank, bearing and bearing cap in section.

Fig. II is a plan view of the bearing cap showing the main bolts and auxiliary screws in section.

Fig. III is an elevation of the lower crank end portion of Fig. I and taken at right angles thereto.

R designates a connecting rod having a shank 1, a wrist pin end 2 and an enlarged crank pin end 3. The wrist pin end is apertured to receive a pair of bearing members 4 fitting about the wrist pin 5.

The enlarged crank pin end 3 is provided with bores 6, 6, one on each side of the crank pin axis and has a detachable bearing box 7 spaced therefrom by a shim 8. The bearing box 7 has a semi-cylindrical bearing surface 9 adapted to embrace a crank pin 10. Bores 11, 11 are provided in the bearing box 7, one on each side of the crank pin axis and in alinement with the bores 6, 6 of the enlarged shank portion 3. A detachable bearing cap 12 having bores 13, 13, one on each side of the crank pin axis and in alinement with the bores 6, 6 and 11, 11 of the members 5 and 7 respectively, and a semi-cylindrical bearing surface 14 adapted to embrace the crank pin, coöperates with the semi-cylindrical bearing surface 9 of the box 7.

The mating faces 15 and 16 of the parts 7 and 12 respectively are machined plane and have concentric interlocking surfaces 17 and 18 respectively, the portions of the faces 15 bounded by the arcuate surface 17 telescoping into an arcuate flange having the surface 18 of the cap 12. By making the mating faces arcuate and concentric it is possible to machine them with great ease, the plane surface and the interlocking surface being machined in one operation and by the use of a single rotary tool. The arcuately interlocking arrangement of the bearing sections prevent their independent sliding movement on the crank pin in the line of the crank pin axis. With the ordinary step-cut mating faces between the upper and lower bearing sections embracing a crank pin, there may be independent movement of the sections in a line parallel to the crank pin axis, unless an additional means is provided to prevent this, as for instance, screws or dowels. The arcuate interlocking which is provided in my invention prevents independent sliding movement of the two bearing sections in a line parallel to the crank pin axis, and the crank pin itself prevents independent rotary movement of these sections.

Removable shims 19 may be inserted between the mating faces 15 and 16. Connecting bolts 20 are adapted to fit loosely within the alined bores 6, 11 and 13 so as to provide an annular clearance between the bolt and bores. Each bolt 20 is enlarged slightly at one end as shown at 21, merely for the purpose of centering the bolt within the bore and not to provide a tight fit therewithin. At this enlarged end is provided a head 22 abutting the bearing cap at the end of the bore 13. The opposite end of the bolt is threaded to receive a tightening nut 23 bearing against the enlarged portion 3 of the shank and located at the end of the bore 6 to hold the portions together in assembled relation.

Sometimes it is desirable to remove the piston through the cylinder without disturbing the crank pin bearing. This can be accomplished by loosening the nuts 23 and lifting off the shank and piston, leaving the crank pin embraced by the bearing 7 and the bearing cap 12. To prevent the parts 7 and 12 from separating when the shank is detached, small screws 24 extend through apertures on each side of the crank pin axis in one of the bearing parts and into corresponding threaded apertures, in the coöperating bearing part. These small screws 24 do not take any of the stresses transmitted between the crank pin and wrist pin when the connecting rod is in service, but are simply for the purpose of preventing the bearing cap from dropping when the nuts 23 are removed.

In order to prevent the bolts 20 from dropping into the crank case when the nuts 23 are removed, special bolt retaining means are provided, as for example, small screws 25 threaded into the cap 12 and provided with washers bearing against the bolt head.

I claim:

1. In a connecting rod, a shank having a crank pin bearing portion, and a bearing cap detachably connected thereto, said bearing portion and cap being in concentrically interlocking engagement, the centers of curvature of the concentric engaging surfaces lying in the crank pin axis.

2. A bearing comprising a pair of bearing sections detachably connected together and having coöperating bearing faces adapted to form a cylindrical space for the member to be rotated in the bearing, each of said bearing sections being provided with curved abutment shoulders at opposite sides of said cylindrical space, and the curved abutment shoulders of one bearing section being engaged with the curved abutment shoulders of the other bearing section, so as to interlock said bearing sections with each other.

3. A bearing comprising a pair of bearing sections detachably connected together and having coöperating bearing faces adapted to form a cylindrical space for the member to be rotated in the bearing, each of said bearing sections being provided with curved abutment shoulders at opposite sides of said cylindrical space, the curved abutment shoulders of one bearing section being engaged with the curved abutment shoulders of the other bearing section, so as to interlock said bearing sections with each other, and the centers of the curvature of said abutment shoulders being within said cylindrical space.

4. A bearing comprising a pair of bearing sections detachably connected together and having coöperating bearing faces adapted to form a cylindrical space for the member to be rotated in the bearing, each of said bearing sections being provided with curved abutment shoulders at opposite sides of said cylindrical space, the curved abutment shoulders of one bearing section being engaged with the curved abutment shoulders of the other bearing section, so as to interlock said bearing sections with each other, and the curved abutment shoulders at one side of said cylindrical space being concentric with the abutment shoulders at the other side of said space.

5. A bearing comprising a pair of bearing sections detachably connected together and having coöperating bearing faces adapted to form a cylindrical space for the member to be rotated in the bearing, each of said bearing sections being provided with curved abutment shoulders at opposite sides of said cylindrical space, the curved abutment shoulders of one bearing section being engaged with the curved abutment shoulders of the other bearing section, so as to interlock said bearing sections with each other, the centers of the curvature of said abutment shoulders being within said cylindrical space, and the curved abutment shoulders at one side of said cylindrical space being concentric with the abutment shoulders at the other side of said space.

In testimony that I claim the foregoing I hereunto affix my signature.

REINHARD HILDEBRAND.